United States Patent
Feraud et al.

(10) Patent No.: US 6,613,720 B1
(45) Date of Patent: Sep. 2, 2003

(54) DELAYED BLENDING OF ADDITIVES IN WELL TREATMENT FLUIDS

(75) Inventors: Jean Pierre Feraud, Venezuela (FR); Michael D. Parris, Richmond, TX (US); Richard D. Hutchins, Sugar Land, TX (US); Stanley Bruce McConnell, Katy, TX (US); Erik B. Nelson, Houston, TX (US); Keith Dismuke, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 174 days.

(21) Appl. No.: 09/688,319

(22) Filed: Oct. 13, 2000

(51) Int. Cl.⁷ .......................... C09K 7/00; E21B 43/27; E21B 43/16; E21B 43/26
(52) U.S. Cl. ................. 507/200; 507/100; 507/103; 507/203; 507/902; 507/922; 507/925; 507/933; 507/939; 166/300; 166/305.1; 166/308
(58) Field of Search ............... 166/300, 305.1, 166/308; 507/100, 103, 200, 203, 922, 902, 925, 933, 939

(56) References Cited

U.S. PATENT DOCUMENTS

| | | | |
|---|---|---|---|
| 4,002,204 A | * 1/1977 | Cavin | 507/100 |
| 4,252,657 A | 2/1981 | Barriol et al. | 252/8.55 D |
| 4,271,907 A | 6/1981 | Gale | 166/274 |
| 4,352,396 A | * 10/1982 | Friedman | 166/300 |
| 4,480,696 A | 11/1984 | Almond et al. | 166/308 |
| 4,608,139 A | 8/1986 | Craun et al. | 428/457 |
| 4,799,549 A | 1/1989 | Vinot et al. | 166/293 |
| 5,445,223 A | 8/1995 | Nelson et al. | 166/308 |
| 5,919,739 A | 7/1999 | Sunde et al. | 507/213 |
| 6,284,714 B1 | * 9/2001 | Bland et al. | 507/100 |

FOREIGN PATENT DOCUMENTS

GB 2341876 A 3/2000

OTHER PUBLICATIONS

"Novel Lost Circulation Treatment," *InstanSeal Brochure* (Jul. 14, 2000).

* cited by examiner

Primary Examiner—Philip Tucker
(74) Attorney, Agent, or Firm—Catherine Menes; Brigitte Jeffery; John J. Ryberg (57) ABSTRACT

The effect of various chemical or biological agents in well treatment fluids can be delayed by sequestering the agents in the discontinuous phase of an emulsion for a period of time, before the emulsion is destabilized by exposure to at least one of: (1) a change in temperature, (2) a change in pH, (3) a change in salinity, (4) a change in alcohol concentration, (5) a change in stabilizing surfactant concentration, (6) a change in organic ion concentration, (7) a change in destabilizing surfactant concentration, (8) a change in surfactant adsorbent material concentration, (9) an ultrasonic pulse, and (10) an electrical field. Upon exposure to the emulsion destabilizing condition, the agent sequestered in the discontinuous phase of the emulsion is released into the continuous phase of the fluid composition, where it can have its intended effect.

45 Claims, 1 Drawing Sheet

Figure 1

DELAYED BLENDING OF ADDITIVES IN WELL TREATMENT FLUIDS

BACKGROUND OF THE INVENTION

1. Field of the Invention

The present invention relates generally to the field of hydrocarbon production from hydrocarbon-bearing formations. More particularly, it concerns fluid compositions that can be useful in improving hydrocarbon production and methods of introducing such fluid compositions into a hydrocarbon-bearing formation.

2. Description of Related Art

Hydrocarbons (oil, natural gas, etc.) are obtained from a subterranean geologic formation (e.g., a "reservoir") by drilling a well that penetrates the hydrocarbon-bearing formation. This provides a partial flowpath for the oil to reach the surface. In order for oil to be "produced," that is travel from the formation to the well bore (and ultimately to the surface), there must be a sufficiently unimpeded flowpath from the formation to the well bore. Unobstructed flow through the formation rock (e.g., sandstone, carbonates) is possible when rock pores of sufficient size and number are present for the oil to move through the formation.

A common reason for a decline in oil production is "damage" to the formation that plugs the rock pores and impedes the flow of oil. Often such damage is a result of methods and chemicals used in establishing the well or in remedial operations performed on it. Another reason for lower than expected production is that the formation is naturally "tight" (e.g., a low permeability formation), with pores sufficiently small that the oil migrates toward the well bore only very slowly.

In general, techniques used to increase the permeability of the formation are referred to as "stimulation." Essentially, one can perform a stimulation technique by: (1) injecting chemicals into the well bore to react with and/or dissolve damage; (2) injecting chemicals through the well bore and into the formation to react with and/or dissolve small portions of the formation to create alternative flowpaths for the hydrocarbon (thus rather than removing the damage, redirecting the migrating oil around the damage); or (3) injecting chemicals through the well bore and into the formation at pressures sufficient to fracture the formation, thereby creating a channel through which hydrocarbon can more readily flow from the formation and into the well bore.

Acids or acid-based fluids, and fluids containing strong chelants have been found to be useful both for the removal of damage and the creation of alternative flowpaths due to their ability to dissolve certain formation minerals and/or certain contaminants introduced into the well bore and formation during drilling or subsequent operations. The most common agents used in acid treatments of wells are mineral acids, though organic acids are also used. Hydrochloric acid is the preferred acid treatment in carbonate formations. For sandstone formations, the preferred fluid is a hydrochloric/hydrofluoric acid mixture. When the treatment is designed to remove damage resulting from a drilling mud filter cake, it is important to moderate the reaction of the fluid with the filter cake. When a strong acid is delivered in a low-viscosity fluid, often the action of removing the low permeability filter cake is localized, and much of the remainder of the acid is lost to the formation without further removal of the filter cake across the damaged zone. Often drilling mud is designed with a combination of polymers and dissolvable minerals, such as calcium carbonate. An emulsion formulated with an internal acid or internal strong chelant can be used to remove the mineral on a moderated basis by slow release. Dissolution of the mineral compromises cake strength making it more easily removed by production pressures. Acids are also utilized in the process called "acid fracturing" for improving permeability in carbonate reservoirs through an etching technique.

At present, such acid-based and chelant-based treatments have several serious limitations: lack of uniform radial and axial (along the wellbore) coverage; corrosion of the pumping equipment and well bore tubing; and reaction rates at higher temperatures that are too rapid. An improved well stimulation fluid that has a moderated reactivity and that is less damaging to equipment is a highly desirable goal.

Hydraulic fracturing involves literally breaking or fracturing a portion of the surrounding strata, by injecting a specialized fluid into the well bore directed at the face of the geologic formation at pressures sufficient to initiate and extend a fracture in the formation. Actually, what is created by this process is not always a single fracture, but a fracture zone, that is, a zone in the formation having multiple fractures, through which hydrocarbon can more easily flow to the well bore.

Certain commonly used fracturing treatments generally comprise at least three principal components: a carrier fluid (usually water or brine), a polymer, and a proppant. Many further comprise a crosslinker. Other compositions used as fracturing fluids include water with additives, viscoelastic surfactant gels, and gelled oils. The purpose of these fracturing fluids is to first create and extend a fracture, and then once it is opened sufficiently, to deliver proppant into the fracture, which keeps the fracture from closing once the pumping operation is completed. The carrier fluid is the means by which proppant and breaker are carried into the formation. A typical fracturing fluid can be prepared by blending a polymer with an aqueous solution (sometimes an oil-based or a multi-phase fluid is desirable); often, the polymer is a solvatable polysaccharide. The purpose of the polymer is to increase the viscosity of the fracturing fluid which aids in the creation.of a fracture; and to thicken the aqueous solution so that solid particles of proppant can be suspended in the solution for delivery into the fracture. In many fracturing treatments, a crosslinking agent is added which further increases the viscosity of the fluid composition by crosslinking the polymer.

In addition to being useful in fracturing, fluids that comprise a polymer and crosslinker can also be useful in the workover of a hydrocarbon producing well to improve production. Such workover fluids (e.g., those used in conformance control and zone abandonment operations, among others) with increased viscosity through polymer crosslinking, especially those that become a gel after crosslinking, are useful for isolating particular zones for subsequent treatment by acids, scale removers, or asphaltene diluents, among others. After the treatment, a gel formed by the workover fluid can be intentionally degraded to remove the barrier. In other cases, the gel permanently plugs the zone.

A chemical or biological agent (e.g., crosslinked polymer, acid, or biocide, among others) that is a useful component of a stimulation or workover fluid can, in certain cases, be neutralized or degraded before reaching the site at which it is to have its effect. Therefore, in certain instances, more of the agent is used in order to be effective and to compensate for agent that is lost in delivering the agent to the site. Thus, there is a need for a more efficient way to deliver useful chemical and biological agents to a desired location in a well.

SUMMARY OF THE INVENTION

The present invention is directed to fluid compositions that can be used in improving hydrocarbon production and methods of introducing such fluid compositions into a hydrocarbon-bearing formation. The invention relates to delaying the action of at least one chemical or biological agent that is sequestered in the discontinuous phase of an emulsion. Upon exposure to one or more destabilizing conditions, the emulsion is disrupted, releasing the sequestered chemical or biological agent into the bulk fluid of the composition, permitting the agent to have its desired effect.

One embodiment is a method of delivering a well treatment fluid composition into a hydrocarbon-bearing formation. In this method, a well treatment fluid that comprises a surfactant stabilized emulsion is pumped into a well. The emulsion comprises a continuous phase and at least one discontinuous phase that comprises at least one chemical or biological agent. The emulsion is destabilized by exposure to at least one of (1) a change in temperature, (2) a change in pH, (3) a change in salinity, (4) a change in alcohol concentration, (5) a change in stabilizing surfactant concentration, (6) a change in organic ion concentration, (7) a change in destabilizing surfactant concentration, (8) a change in surfactant adsorbent material concentration, (9) an ultrasonic pulse, and (10) an electrical field. Destabilization of the emulsion results in the release of the chemical or biological agent from the discontinuous phase.

Another embodiment is directed to a method of delivering a well treatment fluid composition, as described above, into a hydrocarbon-bearing formation. In this embodiment, the well treatment fluid is pumped into a well that comprises a first zone and a second zone. The first zone has a first ambient condition, and the second has a second ambient condition that is different from the first ambient condition in at least one respect (e.g., temperature, pH). The fluid composition comes into contact with the first zone, thereby exposing the fluid composition to the first ambient condition, and later the fluid composition comes into contact with the second zone, exposing it to the second ambient condition. The emulsion of the well treatment fluid remains stable for at least about one minute when the fluid is in contact with the ambient condition in the first zone. However contact with the ambient condition in the second zone destabilizes the emulsion, thereby releasing the chemical or biological agent. The ambient conditions of the first zone and the second zone differ in at least one of (1) temperature, (2) pH, (3) salinity, (4) alcohol concentration, (5) stabilizing surfactant concentration, (6) organic ion concentration, (7) destabilizing surfactant concentration, (8) surfactant adsorbent material concentration, (9) ultrasonic energy, and (10) an electrical field.

Yet another embodiment is directed to a method of delivering a well treatment fluid composition into a hydrocarbon-bearing formation, in which, prior to pumping the fluid into the well, at least one chemical that undergoes a chemical reaction or that dissolves in the well treatment fluid composition is added and mixed into the composition. As the chemical reaction of the chemical proceeds or as it dissolves, it causes a change in at least one of the following characteristics of the well treatment fluid: (1) pH, (2) alcohol concentration, (3) stabilizing surfactant concentration, (4) organic ion concentration, (5) salinity, and (6) destabilizing surfactant concentration. The change in the fluid that results is sufficient to destabilize the emulsion, thus causing the chemical or biological agent to be released. Naturally the pumping of this well treatment fluid must occur before the reaction of the chemical or dissolution of the chemical goes to completion; if this were not the case the release of the chemical or biological agent would not be sufficiently delayed.

Still another embodiment is directed to a well treatment fluid composition, comprising a surfactant stabilized emulsion, wherein the emulsion comprises a continuous phase and at least one discontinuous phase, the discontinuous phase comprising at least one chemical or biological agent. The emulsion in the fluid composition will destabilize sufficiently to release the chemical or biological agent upon exposure to at least one of the conditions listed above. Well treatment fluid compositions of the present invention can be used, for example, in stimulation and workover of oil, gas and water wells, and thus these compositions can be fracturing fluids, acidizing treatment fluids, zone abandonment fluids, conformance control fluids or drilling mud filter cake cleanup fluids depending on their composition and the manner of their application. Well treatment-fluids of the present invention can also be biocide treatment fluids, corrosion inhibition fluids, or breaker fluids.

It is preferred that the emulsion of the fluid compositions of the present invention be a microemulsion, because microemulsions tend to have greater stability than macroemulsions. Preferably, the chemical or biological agent initially in the discontinuous phase is selected from the group consisting of crosslinkers, polymers, biocides, corrosion inhibitors, corrosion dissolvers, pH modifiers, breakers, metal chelators, metal complexors, antioxidants, wetting agents, polymer stabilizers, clay stabilizers, scale inhibitors, scale dissolvers, wax inhibitors, wax dissolvers, asphaltene precipitation inhibitors, waterflow inhibitors, sand consolidation chemicals permeability modifiers, foaming agents, microorganisms, nutrients for microorganisms, and salts. Fluid compositions and methods of the present invention can be used for improved fracturing or workover operations by permitting a delay of crosslinking. For example, a preferred embodiment of the present invention is a fluid composition that comprises a cross-linkable polymer in the continuous phase of the emulsion and a crosslinker in the discontinuous phase of the emulsion. Eventually, the crosslinker is released into the continuous phase due to exposure of the emulsion to an emulsion destabilizing effect. Thus, the crosslinking of the polymer is delayed until the emulsion is destabilized. Alternatively, instead of sequestering the crosslinker to delay crosslinking, the polymer or a pH modifier (the pH modifier causes the pH of the fluid composition to change to a pH favorable for the crosslinking reaction) can be sequestered in the discontinuous phase of an emulsion until the emulsion is disrupted. Thus, in certain embodiments, it is preferred that the polymer and the crosslinker can react with each other readily when the emulsion is destabilized. Such fluid compositions comprising a polymer that becomes crosslinked are particularly useful as fracturing fluids, but can also be used in workover operations.

The delay in crosslinking afforded by certain embodiments of the present invention is beneficial in that the amount of energy required to pump the fluids can be reduced, the penetration of certain fluids can be improved, and shear and frictional damage to polymers can be reduced. By delaying crosslinking, crosslinkers can be more thoroughly mixed with the polymer fluid prior to crosslink initiation, providing more effective crosslinks, more uniform distribution of crosslinks, and better gel properties. Certain embodiments provide better control of crosslinking than certain mechanisms known in the art (e.g., use of delaying ligand for metal crosslinkers).

Furthermore, certain embodiments of the present invention can be used to overcome operational problems at the surface. For example, a wetting surfactant which typically causes problems in pumping due to foaming can be sequestered in the discontinuous phase of the emulsion of a fluid composition of the present invention until its release is triggered by a destabilizing condition downhole.

Delayed release of certain chemicals in various stimulation fluids and workover fluids is also desirable for other reasons. The use of certain methods and compositions of the present invention in hydrocarbon well operations can reduce the damage sustained by tubulars and pumping equipment. For example, mineral acids (e.g., pH modifiers) used in acidizing treatments are corrosive and can cause damage to the tubulars and pumping equipment. If the acid is sequestered and its release delayed until it is in the formation or shortly before it reaches the desired location downhole, damage to pumping equipment and tubulars can be reduced or avoided. Thus, certain embodiments of the present invention are directed to the delayed release of chemicals to minimize damage to pumping equipment and/or well bore structural elements.

Furthermore, using certain methods and compositions of the present invention, improved radial penetration of the hydrocarbon containing formation by certain workover fluids can be achieved. In certain instances, chemical or biological agents, that would normally react in the immediate vicinity of the well bore, are sequestered for a time in an emulsion, allowing them to travel further radially through the formation before reacting.

Another advantage of the present invention is that certain embodiments can be used for slow release of corrosion inhibitors and dissolvers and biocides downhole. Corrosion inhibitors can be slowly released in the well bore to enhance their functionality over time. Biocides can be slowly released to achieve protection over a longer time span, thus requiring lower overall quantities of the biocide.

BRIEF DESCRIPTION OF THE DRAWINGS

The following drawing forms part of the present specification and is included to further demonstrate certain aspects of the present invention. The invention may be better understood by reference to this drawing in combination with the detailed description of specific embodiments presented herein.

DESCRIPTION OF ILLUSTRATIVE EMBODIMENTS

The present invention is directed to fluid compositions and methods of delivering such fluid compositions to a hydrocarbon-bearing formation. Certain embodiments can improve the relative success and efficiency of stimulation and workover operations, thereby leading to improved hydrocarbon production.

The term "fluid composition" as used in the present application refers to a fluid mixture (e.g., liquids and/or gels) that can be pumped into a well bore. The term is meant to encompass compositions that comprise not just liquids, but also solid components (e.g., proppants, like sand) or biological agents (e.g., beneficial bacteria or biologically derived enzymes for breaking fluids). Fluid compositions of the present invention comprise a base fluid that can, for example, be water or brine. The compositions also comprise a surfactant stabilized emulsion.

By definition, an emulsion comprises a continuous phase and at least one discontinuous phase. The emulsion that is used in the fluid compositions of the present invention can be prepared at or near the site of the well bore or the emulsion can be prepared at another site and transported to the site of its intended use. Methods of preparing emulsions are known in the art. It is preferred that the emulsion be prepared offsite, since this can reduce the expense associated with the transport of equipment, materials and expertise necessary to the preparation of an emulsion on site.

It is preferred that the emulsion of the fluid composition be a microemulsion (e.g., the droplets of the discontinuous phase are typically about 0.5 to 200 nm in diameter). In the absence of destabilizing conditions, such as those listed above, microemulsions tend to be relatively more stable than macroemulsions, which often spontaneously separate into two continuous layers with time. Thus microemulsions are better suited to offsite preparation and to storage for a time prior to use (i.e., they can have an improved shelf life). Furthermore, microemulsions frequently have lower viscosities than macroemulsions, making them easier to pump into a well bore to a hydrocarbon-bearing formation. Small droplet size, as is seen in microemulsions, can be advantageous for achieving good penetration of the formation by the discontinuous phase. While the preparation of a macroemulsion often requires a large energy input to achieve high shear mixing, in contrast, microemulsions can often be prepared by a gentle stirring or shaking action.

The emulsions of the present invention are stabilized by at least one stabilizing surfactant. Surfactants (e.g., surface active compounds) are amphiphilic molecules or ions, made up of a hydrophobic and a hydrophilic part. There are four main classes of surfactants, namely anionic, cationic, nonionic, and zwitterionic, based on the nature of the surfactant's hydrophilic part or head group. The hydrophobic portion of a surfactant is referred to as its tail. In compositions of the present invention, it is preferred that most of the stabilizing surfactant be located at the interface between the discontinuous and continuous phase. It should be noted that "stabilizing surfactant" as used in the present application refers to a surface active compound that stabilizes the emulsion, while "destabilizing surfactant" refers to a surfactant that causes a delayed destabilization of the emulsion interface.

A single stabilizing surfactant or a mixture of stabilizing surfactants can be used to stabilize the emulsion. The emulsion stabilizing surfactant used in certain embodiments depends in part on the destabilizing condition that is to be used and on conditions in the environment in which the composition is to be used. In certain embodiments, the destabilization of the emulsion is achieved by reducing the effectiveness of the stabilizing surfactant, or by reducing the stabilizing surfactant concentration at the interface between the discontinuous phase and the continuous phase.

Mixtures of similar stabilizing surfactants belonging to the same class or mixtures of stabilizing surfactants from different classes can be employed in preparing emulsions and microemulsions. Mixtures of similarly structured stabilizing surfactants are preferred, because they are generally less expensive, since certain such mixtures are routinely produced in the course of manufacturing a particular surfactant in which the feedstock used is impure. These mixtures can offer advantages over their pure counterparts by extending the useful range in which emulsions are formed and remain stable. Certain mixtures of stabilizing surfactants from different classes, such as combinations of nonionic and cationic surfactants or of anionic and cationic surfactants, can have synergistic effects that can be used to prepare emulsions. In contrast, other mixtures of surfactants from different classes can result in interaction between the different types of surfactants that.neutralizes their surfactant characteristics (e.g., a stabilizing surfactant/destabilizing surfactant relationship), diminishing the ability of the stabilizing surfactant to stabilize an emulsion. Such surfactants that destabilize the emulsion in the fluid composition are encompassed by the term "destabilizing surfactants" in the present application.

Stabilizing surfactants used in the present invention can have their ability to stabilize an emulsion affected by exposure to changes in salinity, temperature, pH, and concentration of various other materials present in their immediate environment, among other factors. In certain embodiments of the present invention, it is these sensitivities or other characteristics of the stabilizing surfactants, which permit the controlled release of chemical and biological agents present in the discontinuous phase of an emulsion. (Embodiments that rely on application of an electrical field or an ultrasonic pulse do not necessarily require diminishing a stabilizing surfactant's ability to stabilize an emulsion by decreasing its concentration or stabilizing properties to disrupt the emulsion.)

Destabilizing surfactants reach a level at the interface to cause destabilization at a later time following pumping the composition into the well. If beneficial microorganisms are being introduced, the microorganisms can produce biosurfactants that destabilize the surfactant stabilized emulsion initially present in the fluid composition.

Stabilizing surfactants and destabilizing surfactants suitable for use in particular embodiments of the present invention include alkylamines such as octadecylamine (commercially available as Kemamine), ethoxylated amines (commercially available in a variety of chain lengths as Ethomeens), alkyl polyethylene oxide sulfates, alkyl alkanolamine sulfates, alkanolamides such as oleic diethanolamide, amine oxides such as lauramine oxide, polyalkoxy esters, polyethyleneglycol esters such as PEG 200 dilaurate (available from Stepan), ether alcohol sulfates, alkyl sulfates such as sodium lauryl sulfate, carboxylic acid salts (e.g., sodium stearate), alkyl aryl sulfates and sulfonic acids such as dodecylbenzenesulfonic acid, petroleum sulfonates, alpha olefin sulfonates, sorbitan monolaurate, monooleate (commercially available as Span 80), sorbitan trioleate, sorbitan monopalmitate, sorbitan tristearate, and quaternary amines such as dimethyl didodecenyl ammonium chloride, (Z)-13 docosenyl-N-N-bis (2-Hydroxyethyl) methyl ammonium chloride, cetyl triammonium bromide, cetyl triammonium chloride and dicetyl dimethyl ammonium chloride, nonionics such as polyoxyethylene monoleate, polyoxypropylene monoleate, polyoxyethyleneamide, and polyoxyethylene alcohols, amphoterics such as betaines (cocamidepropyl betaine available from Stepan as AMPHOSOL CA), di-stearyl phthallic amide, glycerol esters such as glycerol stearate, glycol esters such as propylene glycol stearate, and hydrotopes such as sodium xylene sulfonate.

As discussed above, in certain embodiments of the present invention, the well treatment fluid comprises at least one polymer and at least one crosslinker, the polymer and crosslinker reacting under proper conditions to produce a crosslinked polymer. Preferred classes of polymers include galactomannan polymers and derivatized galactomannan polymers; xanthan gums; hydroxycelluloses; hydroxyalkyl celluloses; polyvinyl alcohol polymers (such as homopolymers of vinyl alcohol and copolymers of vinyl alcohol and vinyl acetate); and polymers (such as homopolymers, copolymers, and terpolymers) that are the product of a polymerization reaction comprising one or more monomers selected from the group consisting of vinyl pyrrolidone, 2-acrylamido-2-methylpropanesulfonic acid, acrylic acid and acrylamide, among others. Certain polyvinyl alcohol polymers can be prepared by hydrolyzing vinyl acetate polymers. Preferably the polymer is water-soluble. Specific examples of polymers that can be used include: guar, hydroxypropyl guar, carboxymethyl guar, carboxymethylhydroxypropyl guar, hydroxyethyl cellulose, carboxymethylhydroxyethyl cellulose, hydroxypropyl cellulose, hydrolyzed polyacrylamides, copolymers of acrylic acid and acrylamide, xanthan, and mixtures thereof, among others.

Suitable crosslinkers can comprise a chemical selected from the group consisting of aluminum, chromium, iron, boron, titanium, and zirconium. Crosslinkers that comprise borate, titanium or zirconium are especially preferred. Borate crosslinking is typically controlled through the pH of the fluid composition.

Fluid compositions of the present invention can further comprise other additives. Many of the specialty additives, particularly those used in stimulation or workover, are designed to improve permeability of either the proppant pack or the reservoir rock matrix. Other additives are included to enhance the stability of the fluid composition itself to prevent breakdown caused by exposure to oxygen, temperature change, trace metals, constituents of water added to the fluid composition, and to prevent non-optimal crosslinking reaction kinetics. The choice of components used in fluid compositions of the present invention is dictated to a large extent by the properties of the hydrocarbon-bearing formation on which they are to be used. Such additives can be selected from the group consisting of water, oils, salts (including organic salts), crosslinkers, polymers, biocides, corrosion inhibitors and dissolvers, pH modifiers (e.g., acids and bases), breakers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, sand consolidation chemicals, proppants, permeability modifiers, viscoelastic fluids, gases (i.e., nitrogen and carbon dioxide), foaming agents, microorganisms, and nutrients for microorganisms.

At least one chemical or biological agent can be sequestered in the discontinuous phase for delayed release, and is selected from crosslinkers, polymers, biocides, corrosion inhibitors and dissolvers, pH modifiers, breakers, metal chelators, metal complexors, antioxidants, wetting agents, polymer stabilizers, clay stabilizers, scale inhibitors and dissolvers, wax inhibitors and dissolvers, asphaltene precipitation inhibitors, waterflow inhibitors, sand consolidation chemicals, permeability modifiers, foaming agents, microorganisms, nutrients for microorganisms, and salts. One or more of these agents can also be present in the continuous phase.

Figure 1:
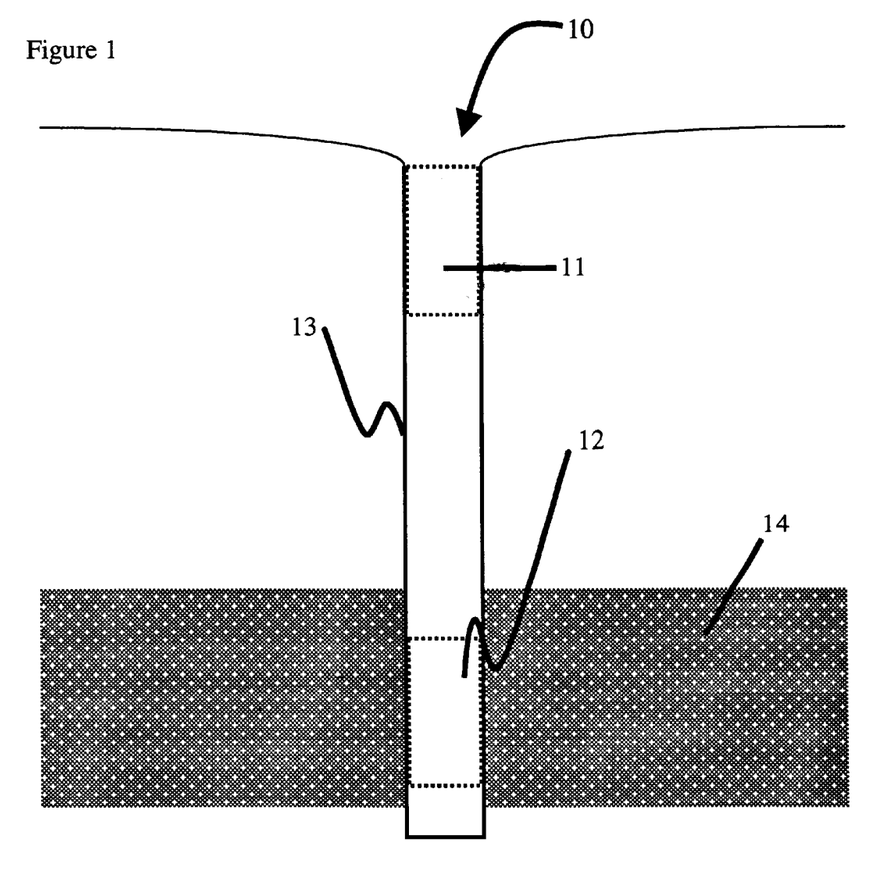
FIG. 1 is cross sectional view of a well in accordance with the present application.

The term "well" as used in this specification includes the surface site from which a well bore has been drilled to a hydrocarbon-bearing formation and the well bore itself, as well as the hydrocarbon-bearing formation that surrounds the well bore. FIG. 1 illustrates one configuration of a well as the term is used in the present invention. The well bore 13 reaches from the surface site 10 to the hydrocarbon-bearing formation 14. The first zone 11 of the well extends down from the surface site 10 for at least about 100 feet. The second zone 12 is located further down within the well bore 13 near the hydrocarbon-bearing formation 14. In this particular configuration, a certain distance separates the first zone 11 and the second zone 12. However, the two zones can be, in certain embodiments, immediately adjacent to one another.

In one preferred embodiment of the present invention for fracturing, the "first zone" of the well comprises the surface site and about the top two-thirds of the well bore, while the "second zone" comprises about the bottom third of the well bore and the surrounding hydrocarbon-bearing formation, such that the well-treatment fluid increases its viscosity in the bottom third of the well bore.

The first zone has a first ambient condition and the second zone has a second ambient condition that differs from the first ambient condition. "Ambient condition" as used herein refers to a condition that exists in a given zone prior to the well treatment fluid composition making contact with that zone. This "ambient condition" can be naturally occurring in the zone or it can be a condition that has been manipulated by pumping certain fluids or chemicals into the zone prior to the well treatment fluid being pumped into the zone. The "ambient condition" need not be uniform throughout the zone. Indeed, in certain embodiments, a gradient of the condition can exist within a zone or can extend from the surface site to the bottom of the well bore.

Destabilization of the emulsion in the present invention results in the release of the chemical or biological agent that was sequestered in the discontinuous phase permitting the agent to have its desired effect. Emulsions used in fluid compositions and methods of the present invention can be destabilized by exposure to a change in at least one of the following conditions: (1) temperature, (2) pH, (3) salinity, (4) alcohol concentration, (5) stabilizing surfactant concentration, (6) organic ion concentration, (7) destabilizing surfactant concentration, (8) surfactant adsorbent material concentration, (9) ultrasonic energy, and (10) an electrical field. The change can occur due to a change in the fluid composition without influence by external conditions, as when the composition comprises a chemical that reacts slowly or dissolves slowly to change at least one of the following characteristics of the well treatment fluid: pH, alcohol concentration, stabilizing surfactant concentration, organic ion concentration, salinity and destabilizing surfactant concentration. Alternatively, the change can be the result of contact between the fluid composition and the first and second zones of the well, wherein the ambient conditions of the two zones differ in at least one of these conditions, and contact of the fluid composition with the second zone causes destabilization of the emulsion that comprises it.

The destabilizing condition that results in delayed release of the chemical or biological agent can be due to (a) a naturally occurring difference between different regions of a well (i.e., a well with a high temperature, high salinity, or surfactant adsorbent hydrocarbon-bearing formation), (b) a fluid composition pumped into the well that immediately affects a condition at the location to which it is delivered (i.e., when an alkaline fluid is pumped into a well prior to pumping in the fluid comprising the emulsion), (c) a fluid composition delivered into the well that gradually results in a destabilizing condition (i.e., when a fluid comprising components that react slowly to modify the pH level or alcohol level, or that consume or alter the stabilizing surfactant, is pumped into a well prior to pumping the fluid comprising the emulsion), or (d) a fluid composition can gradually change without external influence to attain a destabilizing condition (i.e., when a fluid composition comprises a component that is slowly dissolved until it causes destabilization of the emulsion). In certain embodiments of the present invention, the destabilizing condition exists in the second zone, and thus the condition can exist naturally in the second zone, or the conditions of the second zone can be manipulated to result in a destabilizing condition, as described above.

Certain fluid compositions of the present invention can have a relatively low viscosity as they are pumped into the well bore to the formation, and increase in viscosity as they approach the hydrocarbon-bearing formation (e.g., fracturing fluids) or after they have penetrated the hydrocarbon-bearing formation (e.g., workover fluids). This change in viscosity can occur as a direct or indirect result of the release of the chemical or biological agent from the discontinuous phase. In the case of fracturing fluids, it is optimal for the increase in viscosity (e.g., crosslinking) of the fracturing fluid to be delayed until the fluid is down about two-thirds of the length of the well bore or further, such that the increase in viscosity of the fluid occurs before the fluid and the proppant reach the fracture entrance. (With viscous fracturing fluids, it is often desirable for there to be a subsequent decrease in their viscosity to enhance the flow of production fluids through the established fracture, and breakers can be used to bring about this decrease following the treatment.)

The primary reason to sequester a chemical or biological agent is to prevent its interaction with the bulk fluid or environment (e.g., well bore or formation matrix) until it is released. Often it is preferred that the chemical or biological agent is not released until the fluid composition is in the matrix. Crosslinking of polymers is used to increase viscosity in fracturing and workover fluids, and delay of crosslinking is useful for the reasons enumerated above. Delayed release of pH modifiers (e.g., acids and bases) can be used to initiate crosslinking, to inhibit crosslinking, to destroy crosslinking, or to enhance the stability of crosslinks over broader time and temperature ranges. When the pH modifier is an acid used in an acidizing treatment fluid, particularly a mineral acid, delayed release can be used to prevent corrosive damage to equipment. Breakers are intended for use in reducing the viscosity of viscous fluids (e.g., viscoelastic surfactants or non-crosslinked or crosslinked polymer fluids) and can be selected from: oxidative breakers (e.g., ammonium and alkali metal-persulfates, bromates and hypochlorites, alkaline earth bromates and hypochlorites, and hydrogen or organic peroxides), enzymes, pH modifiers, metal chelators or complexors, polymer hydrolysis enhancers, and micelle disturbing substances. Micelle disturbing substances are particularly useful in decreasing the viscosity of viscoelastic surfactant gels to permit improved hydrocarbon flow. Their delayed release can improve their ability to penetrate the regions in which the viscoelastic surfactant gel is present. Thus, in many instances, delayed release of breakers can improve their effectiveness.

Delayed release of antioxidants (or a continual release) can be used in preventing premature polymer chain cission, preserving gel stability and generally extending the life of a fluid composition. The delayed release of wetting surfactants can be used to prevent changes to wettability or to improve the wettability of rock that is not readily wetted, while minimizing foaming during pumping. Clay stabilizers prevent swelling of clay in a formation and can reduce migration of fine particles that can be induced by salinity changes in the formation, and it is preferred that their effect occurs downhole, particularly if the fluid comprises small particles. Sand consolidation chemicals can be used to stabilize reservoir sand or proppant, but consolidation of proppant as a fluid is being pumped into a well bore is undesirable and thus it is preferred that the effect of these chemicals be delayed. Obviously, delayed release of a water flow inhibiting material is desirable to prevent its interaction with aqueous bulk fluid during pumping.

Biocides prevent detrimental bacterial growth in the reservoir and well bore, especially the growth of sulfate reducing bacteria. Their delayed release can improve their effectiveness, as explained above. Alternatively, favorable microorganisms (along with nutrients necessary to their metabolism) which produce chemicals that can improve the post-treatment production can also be delayed until the pumping of the treatment is finished. Again, sequestering a chemical or a biological agent can prevent its interaction with the bulk fluid or fluid environment until its release. The purposes for delaying release of agents described above are not meant to represent an exhaustive list, but rather are meant to be examples of circumstances in which methods and compositions of the present invention could be usefully employed.

One example of a situation in which a change in temperature can be used to bring about the destabilization of an emulsion, is when a fluid composition comprising a stabilizing surfactant experiences a change in temperature such that the cloud point or phase inversion temperature of the stabilizing surfactant is reached. A change in temperature can also have indirect effects by, for example, affecting the solubility of other components of the fluid composition that can change the stabilizing surfactant's ability to stabilize the emulsion. For instance, an increase in temperature could increase the solubility of a slightly soluble salt present in the fluid composition, changing the salinity of the solution and affecting the stability of the emulsion. In addition, temperature accelerated reactions such as hydrolysis of certain surfactants or esters can be used to bring about the destabilization of an emulsion.

When destabilization of the emulsion is due to its exposure to a change in temperature, it is preferred that the change in temperature be due to the change in temperature of the fluid composition as it is pumped from the top of the well bore to the hydrocarbon-bearing formation. Thus the difference in temperature that destabilizes the emulsion can be due to the naturally occurring difference in temperature between a first zone and a second, lower zone of the well that is at or near (e.g., within about 100 feet of) the hydrocarbon-bearing formation. In some wells, the subterranean hydrocarbon-bearing formations have temperatures exceeding 250° F. Thus, this naturally occurring delta T can be used advantageously to destabilize the emulsion as its temperature adjusts to the relatively higher ambient temperature of the hydrocarbon-bearing formation. The preferred temperature for releasing an emulsified crosslinker in a fracturing fluid is from about 70° F. to about 250° F., more preferably from about 80° F. to about 175° F. and most preferably from about 95° F. to about 140° F. For acidizing treatments, conformance control, zone abandonment and drilling mud filter cake removal applications, the temperature for emulsion destabilization is primarily dictated by the existing bottom hole static temperature.

Stabilizing surfactants particularly useful for preparing emulsions that can be destabilized by a change in temperature include those which experience a cloud point upon heating. Exemplary stabilizing surfactants and their cloud points as measured in water include n-$C_6H_{13}(OC_2H_4)_3OH$, CP=37° C., n-$C_{14}H_{29}(OC_2H_4)OH$, CP=45°C., n-$C_{10}H_{21}(OC_2H_4)_6OH$, CP=60° C., and $C_{12}H_{23}(OC_2H_4)_{9.2}OH$, CP=45°C., among others. It should be recognized that some salts will elevate the cloud point while others will lower the cloud point, so the actual cloud point must be measured in the final fluid composition.

As alluded to above, exposure to a change in pH can destabilize certain emulsions used in the present invention. A change in pH of a stabilizing surfactant's environment can cause a decrease in the solubility of the stabilizing surfactant or can change its chemical properties such that its ability to act as a stabilizing surfactant is impaired (e.g., the hydrolysis of certain surfactants is greatly accelerated in the presence of hot acids or hot alkali). Thus, the difference in pH used in destabilizing an emulsion can be due to introduction of pH modifier into the fluid composition after it is pumped into a well. For example, there can be a pre-existing difference in pH between a first zone and a second zone, wherein at least one pH modifier is present in the second zone at a higher concentration than it is in the first zone. The higher pH modifier concentration in the second zone can be naturally occurring or can be the result of manipulation (e.g., pH modifier delivered to the second zone or components that react to produce pH modifier delivered to the second zone).

Alternatively, such a change in pH that results in destabilization of the emulsion can be the result of at least one of a slowly generated pH modifier (e.g., an acid or a base) resulting from a chemical reaction of one or more components already present in the fluid composition when the fluid composition is pumped into the well bore, an interaction between components of the well treatment fluid and materials present in the well, or a slow dissolution of one or more components already present in the fluid composition when the fluid composition is pumped into the well. For example, magnesium oxide included in certain fluid compositions could be solubilized slowly to change the pH of the composition. In certain embodiments of the present invention, it is preferred that the pH modifier be a base. For example, crosslinking by a borate of certain polymers (e.g., guar polymers) occurs at an alkaline pH.

Examples of alkaline pH modifiers that can be used to cause emulsion destabilization include alkali metal hydroxides, oxides, phosphates, carbonates and bicarbonates; alkaline earth oxides, phosphates, and carbonates; ammonium hydroxide, ammonium carbonate, and ammonium bicarbonate; alkali metal silicates, and base precursors such as ureas and substituted ureas, cyanates, alkylamines and certain alkanolamines, quaternary ammonium salts, ammonium salts and salts of a weak acid and a strong base, among others.

Exemplary acidic pH modifiers include inorganic acids such as hydrochloric or hydrofluoric acid; organic acids such as citric, acetic, formic acid; and acid precursors such as hydrolyzable esters, acid anhydrides, sulfonates, organic halides, and salts of a strong acid and a weak base, among others. Preferred acid-producing chemical reactions that can be used to advantage in the present invention include those that rely on hydrolyzable esters as precursors. Esters can be hydrolyzed to form acid and alcohol. Exemplary esters include methyl, ethyl and propyl formates; methyl, ethyl and propyl acetates; dimethyl- or diethyl-oxalate, malonate, succinate, glutarate, adipate, pimelate, maleate and fumarate, among others. Preferred base-producing chemical reactions that can be used to destabilize the emulsion include those that rely on ureas and cyanates. Exemplary bases include urea, thiourea, methyl and ethyl ureas, dimethyl and diethyl ureas; tetramethyl urea, and sodium cyanate, among others. Thus, certain fluid compositions of the present invention can comprise acid or base precursors that are added to the fluid composition just prior to the composition being pumped into the well bore, where they subsequently undergo chemical reaction to produce pH modifiers that destabilize the emulsion. Preferably, the chemical reaction does not go to completion before the chemical or biological agent is to be released. If added too early, reactions of such materials could result in premature destabilization of the emulsion.

Examples of pH sensitive stabilizing surfactants that can be employed in the present invention include all classes of surfactants. Suitable stabilizing surfactants that are sensitive to pH change include ether alcohol sulfates, alkyl sulfates, carboxylic acid salts (e.g., sodium stearate), alkyl aryl sulfonates and sulfonic acids, petroleum sulfonates, alpha olefin sulfonates, sorbitan monolaurate, sorbitan trioleate, oleic acid, sorbitan monopalmitate, sorbitan tristearate, dimethyl didodecenyl ammonium chloride, (Z)-13 docosenyl-N-N-bis (2-Hydroxyethyl) methyl ammonium chloride, cetyl triammonium bromide, cetyl triammonium chloride and cocamidopropyl betaine, among others.

In certain embodiments, it is preferred that at least one polymer and at least one crosslinker be in the continuous phase, and that the discontinuous phase comprises at least one pH modifier. In such embodiments, the initial pH of the continuous phase is such as to inhibit the reaction of the at least one crosslinker and the at least one polymer, until destabilization of the emulsion results in the release of the pH modifier (e.g., a base) from the discontinuous phase. Release of the pH modifier results in a change of the pH of the continuous phase such that the crosslinking reaction can occur.

In certain embodiments used in acidizing treatments, the pH modifier that is sequestered in the discontinuous phase can be a mineral acid or organic acid. Such acids can be damaging to pumping equipment and tubulars, and sequestration of the acid until its release downhole can help minimize such damage.

Exposure to a change in salinity of certain fluid compositions can also be used to destabilize certain emulsions used in the present invention. A change in salinity can be the result of dissolving salts or introducing salt solutions into the fluid composition. The salt or salt solution can be present in the well prior to pumping of the fluid composition. Slowly dissolving salts or salts that are a component of the fluid composition when it is pumped into the well bore, which experience a substantial increase in solubility with temperature, can also be utilized.

An increase in salt concentration can have a "salting out" effect on a stabilizing surfactant, causing stabilizing surfactant precipitation and reducing the stabilizing effect of the stabilizing surfactant on the emulsion. Alternatively, a change in salinity can negatively influence the packing of stabilizing surfactant molecules at the interface of the discontinuous phase and the continuous phase. Exemplary salts include ammonium and alkali metal chlorides and nitrates, among others. Alkaline earth chlorides and nitrates are also useful, but the possibility of encountering sufficient sulfates within the formation must be considered to prevent an alkaline earth sulfate precipitation from occurring.

Examples of stabilizing surfactants sensitive to changes in salinity that can be employed in embodiments of the present invention include ionic surfactants such as anionic, cationic or zwitterionic surfactants. Suitable stabilizing surfactants that are sensitive to changes in salinity include alkyl polyethylene oxide sulfates, alkyl alkanolamine sulfates, ether alcohol sulfates, alkyl sulfates, carboxylic acid salts (e.g., sodium stearate), alkyl aryl sulfonates and sulfonic acids, petroleum sulfonates, alpha olefin sulfonates, dimethyl didodecenyl ammonium chloride, (Z)-13 docosenyl-N-N-bis (2-Hydroxyethyl) methyl ammonium chloride, cetyl triammonium bromide, cetyl triammonium chloride and cocamidopropyl betaine, among others. The particular interaction between stabilizing surfactant and salt depends upon the stabilizing surfactant and the salt. For example, sulfonate surfactants are known to be salt tolerant.

Another destabilizing condition consists of exposing the fluid composition to a change in alcohol concentration. Such a change can result from a slow alcohol producing or consuming chemical reaction of one or more components already present in the fluid composition when the fluid composition is pumped into the well bore, introduction of an alcohol into the fluid composition after the fluid composition is pumped into the well, introduction of a diluent into the fluid composition after the fluid composition is pumped into the well, or a combination of two or more of these. Alcohols whose concentration can be used to affect emulsion stability include aliphatic alcohols such as methyl, ethyl, propyl, butyl and cetyl alcohol; aromatic alcohols such as phenol, cresol, naphthol or thymol; glycols such as ethylene, propylene or butylene glycol and polymerized forms such as polyethylene glycol; and naphthalene and anthracene diols, among others. Other compounds which can act as alcohols include mutual solvents such as ethyleneglycolmonobutylether, ethoxylated alcohols, and mixtures thereof.

The change in alcohol concentration can be due to either an increase in concentration or a decrease in concentration of the alcohol in a fluid composition. An increase in alcohol concentration can be, for example, as a result of hydrolysis of esters that comprise the fluid composition. The esters can be formulated to release various chain length alcohols. Alcohols can have disruptive effects on the stabilizing surfactant packing ratio causing emulsion instability by disruption of micelles. Still in other cases, alcohols can interact with surfactants to enhance emulsion stability, hence in such instances a decrease in alcohol concentration could be taken advantage of to cause destabilization, where the alcohol is originally present in the emulsion as a cosurfactant.

Examples of stabilizing surfactants sensitive to changes in alcohol concentration that can be employed in the present invention include alkyl polyethylene oxide sulfates, alkyl alkanolamine sulfates, alkyl sulfates, carboxylic acid salts (e.g., sodium stearate), alkyl aryl sulfonates, petroleum sulfonates, alpha olefin sulfonates, (Z)-13 docosenyl-N-N-bis (2-Hydroxyethyl) methyl ammonium, cetyl triammonium bromide, and cetyl triammonium chloride, among others.

Another destabilizing condition that can be used is a change in emulsion stabilizing surfactant concentration in the fluid composition, particularly a decrease in concentration. The decrease in stabilizing surfactant concentration can be due to the depletion of one or more surface active compounds from the emulsion interface. Such a change in stabilizing surfactant concentration at the emulsion interface can result from a slow stabilizing surfactant consuming chemical reaction, introduction of a diluent into the fluid composition after the fluid composition is pumped into the well, a change in solubility of the stabilizing surfactant, mass transfer of the stabilizing surfactant into the bulk phase, or adsorption of the stabilizing surfactant onto a surfactant adsorbent material, or a combination of these. For example, a stabilizing surfactant can react with another chemical component to form an insoluble precipitate or to form a product that lacks surfactant properties, the stabilizing surfactant concentration is reduced, and if reduced sufficiently can cause destabilization of the emulsion. When a diluent is added to the fluid composition to decrease the stabilizing surfactant concentration, the nature of the diluent used is dependent on the composition of the discontinuous phase. Preferably, the diluent comprises a fluid component of the discontinuous phase.

A number of different factors can decrease a stabilizing surfactant's solubility, causing a decreased concentration of stabilizing surfactant in the fluid composition. A change in solubility of the stabilizing surfactant can be the result of a change in the temperature of the fluid composition, the pH of the fluid composition, the salinity of the fluid composition, the destabilizing surfactant concentration of the fluid composition, or the alcohol concentration of the fluid composition, or a combination of such changes.

The stabilizing surfactant can be at a lower concentration in the second zone of the well due to a chemical that reacts to consume the stabilizing surfactant being pumped into the second zone Alternatively, an ambient condition can exist in the second zone that decreases the solubility of the stabilizing surfactant. As stated above, the ambient condition of the second zone that decreases the solubility can be selected from the group consisting of temperature, pH, salinity, and alcohol concentration. Furthermore, the presence of surfactant adsorbent material in the well can also decrease the stabilizing surfactant concentration sufficiently to destabilize the emulsion. The lower concentration in the second zone can also be due to some combination of two or more of these factors (for example, the combination of increased alcohol concentration in the second zone with a certain destabilizing pH in the second zone).

Sufficient reduction in concentration of any stabilizing surfactant can result in destabilization. However-if the reduction in concentration is due to a change in solubility as a result of a change in pH, a change in temperature, a change in alcohol concentration, or a change in salt concentration, certain stabilizing surfactants are preferred. For example, when the reduction in the concentration is due to a change in solubility because of a shift in a composition's pH, ionic surfactants are preferred.

Another condition that can affect stabilizing surfactant concentration is exposure to a surfactant adsorbent material. "Surfactant adsorbent material" as used herein is meant to refer to materials for which the stabilizing surfactant has a high affinity for adsorption, such that its affinity for the material competes with its affinity for the interface of the emulsion. In certain cases a stabilizing surfactant can be readily adsorbed by a proppant used in fracturing. This adsorption alters the stabilizing surfactant's effective concentration as less stabilizing surfactant is available at the interface of the emulsion. Typical materials used as proppants that can act as surfactant adsorbent materials include sand (e.g., 20–40 mesh), bauxite, man-made intermediate-strength or high strength materials and glass beads, among others. The proppant can also be coated with resin, which causes the resin particles to stick to one another, to help prevent proppant flowback in certain applications. Furthermore, certain stabilizing surfactants have an affinity for the rock surface of the formation.

Other materials that can adsorb the stabilizing surfactant from the fluid composition due to the stabilizing surfactant's affinity for them can, for example, be materials naturally occurring in the formation, like clays. Alternatively, added clays can also be used. Natural clays typically have a relatively large negatively charged surface, and a much smaller surface that is positively charged. The use of a cationic surfactant in the emulsion would promote its adsorption through an electrostatic mechanism based on the attraction of oppositely charged entities. Examples of high surface area materials that can be used as surfactant adsorbent materials include clays such as bentonite, illite, montmorillonite and synthetic clays. Some clays have been altered to adjust surface charge or wettability by attaching highly adsorbed molecules onto their surfaces. These treated clays can also be used in this invention. Many clay products including natural, treated and synthetic clays are marketed by Southern Clay Products. In general, clays have a greater surface area available for adsorption of surfactant than do proppants.

In certain embodiments, an increase in organic ion concentration can be used as a destabilizing condition. Organic ions can influence the stabilizing surfactant packing ratio, causing emulsion instability either through changes to a hydrophobic synergy or ionic interaction with the charged surfactant. The change in organic ion concentration can result from a slow organic ion producing chemical reaction of one or more components already present in the fluid composition when the fluid composition is pumped into the well bore, introduction of an organic ion into the fluid composition after the fluid composition is pumped into the well, or a combination of these. For example, hydrolysis of an ester or an acid anhydride can generate an organic acid having an organic ion that disrupts the emulsion by causing a decrease in pH. Exemplary organic ions include salicylate and salicylic acid, acetosalicylate, phthalate and diallyl dimethyl ammonium chloride, among others. Examples of esters include methyl and ethyl salicylate. Stabilizing surfactants sensitive to changes in organic ion concentrations include cetyl triammonium chloride, cetyl triammonium bromide and (Z)-13 docosenyl-N-N-bis (2-Hydroxyethyl) methyl ammonium chloride, among others.

Change in destabilizing surfactant concentration can also be used to destabilize the emulsion to permit release of a sequestered chemical or biological agent, particularly an increase in concentration of a destabilizing surfactant that destabilizes a surfactant stabilized emulsion by either its interaction with the stabilizing surfactant or by its interaction with the discontinuous phase. A destabilizing surfactant can comprise one or more of the surfactants listed above, but should comprise a different surface active compound than the stabilizing surfactant. For example, emulsions can be prepared from mixtures of cationic and anionic surfactants such as sodium dodecyl sulfate and cetyl triammonium chloride in non-equimolar concentrations, since equimolar concentrations will precipitate, and the destabilization is delayed. The destabilization process is a gradual process wherein the destabilizing surfactant concentration at the interface increases until destabilization occurs or an interaction between the destabilizing surfactant and the stabilizing surfactant proceeds to cause destabilization.

Exemplary combinations of stabilizing and destabilizing surfactants include: anionic-cationic pairs, anionic-zwitterionic pairs and cationic-zwitterionic pairs. Examples of anionic-cationic pairs include sodium docdecylsulfate and cetyl triammonium bromide, among others. Examples of anionic-zwitterionic pairs include sodium lauryl sulfate and cocamidepropyl betaine, where the pH favors the cationic expression of the betaine. Examples of cationic-zwitterionic pairs include dicetyl dimethyl ammonium chloride and cocamidepropyl betaine, where the pH favors the anionic expression of the betaine.

Still another form of destabilizing condition results from exposure of the fluid composition to a change in concentration of a surfactant absorbent material, as alluded to above. This change in concentration can be the result of the fluid composition contacting a surfactant absorbent material already present in the well prior to the pumping of the fluid composition into the well bore, or inclusion of a surfactant absorbent material in the fluid composition. The difference in the first and second zones is due to a continual increase in adsorbed stabilizing surfactant onto the surfactant adsorbent material, which results in eventual destabilization of the emulsion. Exemplary stabilizing surfactant and surfactant adsorbent material combinations include cationic or anionic surfactants with hydrophilic clays such as montmorillonite or organophilic clays, and either cationic or anionic surfactants with silica based proppants such as sand.

Another destabilizing condition that can be employed is exposure to a pulse of ultrasonic energy. Such ultrasonic energy can be generated from an ultrasonic source present at the bottom of the well bore, or in the second zone of the well. The ultrasonic pulse imparts a focussed, high frequency energy to the solution, disrupting the emulsion. Some polymers such as high molecular weight polyacrylamides are susceptible to chain cission by the application of ultrasonic energy, and it is preferred that fluid compositions comprising such polymers not be employed in combination with ultrasonic energy for emulsion destabilization. Ultrasonic pulse sources (e.g., an ultrasonic horn) are known in the art.

Some emulsions can be formed using a mixture of stabilizing surfactants that have a net electrical charge. For example, using a mixture of a cationic surfactant with a nonionic surfactant to stabilize an emulsion can result in droplets of the discontinuous phase having a charge. Thus the charged droplets are subject to interaction with an electrical field that is imposed, like an electrophoretic process. Droplets migrating in the electrical field will tend to collide and coalesce, which results in breakage of micelles and release of chemical or biological agents sequestered in the discontinuous phase. The technology for applying electrical fields downhole is known in the art. Thus, exposure to an electrical field can be a destabilizing condition for certain methods of the present invention, wherein the surfactant stabilized emulsion comprises a single surface active compound or a mixture of surface active compounds that have a net electrical charge.

More than one of the destabilizing conditions listed above can be used in conjunction with each other to result in destabilization of the emulsion. For example, a destabilizing change in pH and in alcohol concentration can be achieved simultaneously in a fluid composition that comprises a stabilizing surfactant (or a mixture of stabilizing surfactants) that is sensitive to both destabilizing conditions (delta pH and delta alcohol concentration) and that comprises esters that are hydrolyzed to produce acid and alcohol.

Similarly, a change in pH, alcohol concentration, and temperature could be used in conjunction to destabilize an emulsion. For example, a fluid composition comprising a stabilizing surfactant sensitive to these changes and an ester that is hydrolyzed could be used in a hydrocarbon-bearing formation with a temperature greater than 250° F. Thus, in this example, changes in temperature, acid concentration, and alcohol concentration can all be factors that combine to destabilize the emulsion.

The choice of destabilizing condition is influenced by factors such as the nature of the agent that is to be temporarily sequestered in the discontinuous phase, the desired length of delay before release of the sequestered agent, the ambient temperature of the formation, the typical salt concentration that a fluid composition attains upon introduction into a formation, the desired minimum shelf life for an emulsion without exposure to a destabilizing condition, and the level of shearing anticipated during pumping of the fluid composition through the well bore.

The following examples are included to demonstrate specific embodiments of the invention. Those skilled in the art should, in light of the present disclosure, appreciate that many changes can be made in the specific embodiments which are disclosed and still obtain a like or similar result without departing from the spirit and scope of the invention.

EXAMPLE 1

Sequestering a borate crosslinker in an emulsion for delayed release was examined through several laboratory tests. The fracturing fluid crosslinking trigger investigated was pH, which delayed crosslinking until destabilization of the emulsion occurred. Not all of the sodium hydroxide used in preparing the fluid composition was sequestered in the discontinuous phase of the emulsion.

A base polymer fluid was prepared by making a 50 lb/1000 gallon guar solution using synthetic seawater (see Table 1). A second base solution was prepared by making a 30 lb/1000 gallon guar solution using fresh water. In both cases, the guar was added as a slurry of the guar in diesel. Directly after the guar was added, the following were added:

1.0 gal/1000 gallons of surfactant mixture (largely containing methanol, isopropanol and ethoxylated isodecyl alcohol)

0.5 gal/1000 gallons of Adomall bactericide (obtained from Nalco Chemical Company)

0.25 gal/1000 gallons of polypropylene glycol (anti-foam)

The solution was stirred for 15 minutes to hydrate fully the guar and then the following additional components were added:

2.00 gal/1000 gallons triethanolamine, 85% active (stabilizer)

10.0 lb/1000 gallons sodium thiosulfate pentahydrate (reducing agent)

40.0 lb/1000 gallons sodium gluconate (delay agent)

40.0 lb/1000 gallons sodium hydroxide (pH modifier)

15.0 gal/1000 gallons potassium carbonate, 47% active (buffer)

The emulsion containing the crosslinker was prepared by first mixing about 50 grams boric acid with 33 grams sodium hydroxide per liter of fresh water. B(OH)$_4$ is the crosslinker. Then 850 ml of this solution were slowly added (with stirring by a blender) to 150 ml of #2 diesel which contained either 0.5 or 1.0% surfactant as designated in Table 2. Tests 1, 11 and 12 did not have a surfactant-stabilized emulsion. Finally, the emulsified crosslinker was added to the guar solution while blending. The blender speed was slow enough to prevent air entrainment, but fast enough to form a vortex. After measuring the vortex closure time, the fluid was transferred to a paper cup to measure the hang lip time. The vortex closure time is defined as the elapsed time when the vortex disappears and the surface of the crosslinked fluid ceases to move. Hang lip time is defined as the elapsed time when the fluid can be momentarily suspended from the lip of one of the cups when poured between two paper cups. The start time for both tests is the time at which crosslinker is added to the blender. A rheology test was performed to measure stability of the gel at 149° C. using a Fann 50 viscometer equipped with a standard B5 bob. Stability is defined as the time where the fluid viscosity remains above 100 centipoise (measured at a shear rate of 100 sec$^{-1}$); Results are recorded in Table 3 for the seawater examples (50 pounds per 1000 gallons guar) and in Table 4 for the freshwater samples (30 pounds per 1000 gallon guar).

TABLE 1

Synthetic Sea Water Recipe

| Salt | grams/liter |
| --- | --- |
| KCl | 0.263 |
| CaCl$_2$ | 1.175 |
| NaHCO$_3$ | 0.198 |
| Na$_2$SO$_4$ | 3.901 |
| NaCl | 23.527 |
| MgCl$_2$.6H$_2$O | 11.838 |

TABLE 2

Concentrations Used in Emulsified Crosslinker Formulation

| Test | Emulsifier, wt % | Solvent |
| --- | --- | --- |
| | Sea water gels | |
| 1 | none | none |
| 2 | Span$^a$ 80, 1% | #2 diesel |
| 3 | Span 80, 1% | #2 diesel |
| 4 | Ethomeen$^b$, 0.5% | #2 diesel |
| 5 | Kemamine$^c$, 0.5% | #2 diesel |
| 6 | Span 80, 0.5% | #2 diesel |
| 7 | Span 80, 0.5% | #2 diesel |
| 8 | Ethomeen, 1% | #2 diesel |
| 9 | Span 80, 0.5% | heptane |
| 10 | Ethomeen, 1% | #2 diesel |
| | Fresh water gels | |
| 11 | none | none |
| 12 | none | none |
| 13 | Span 80, 0.5% | #2 diesel |
| 14 | Span 80, 0.5% | #2 diesel |
| 15 | Span 80, 0.5% | #2 diesel |

$^a$Span 80 available from Uniqema
$^b$Ethomeen available from Akzo Nobel Chemicals, Inc.
$^c$Kemamine available from Witco Corp.

TABLE 3

Concentrations and Results for the Seawater Examples
Solutions contain 50 ppt[d] guar polymer,
10 ppt boric acid and 40 ppt NaOH

| Test | Delay agent[e] ppt | Vortex Closure minutes:seconds | Hang Lip Time minutes:seconds | Stability hours |
|---|---|---|---|---|
| 1 | 40 | 0:05 | 0:15 | 5 |
| 2 | 20 | 5:30 | 9:50 | 2 |
| 3 | 40 | 3:40 | 5:50 | 1.5 |
| 4 | 40 | 0:34 | 0:59 | 5 |
| 5 | 40 | 0:55 | 1:20 | 4 |
| 6 | 40 | 1:04 | 1:37 | 5 |
| 7[f] | 40 | 1:30 | 2:30 | NA[h] |
| 8 | 40 | 0:52 | 1:26 | 5 |
| 9 | 40 | 1:55 | 3:45 | 5 |
| 10 | g | 0:42 | 0:53 | 4 |

[d]ppt means lb of chemical per 1000 gallons of hydrated guar solution
[e]delay agent is sodium gluconate
[f]higher energy mixing employed in this example
[g]5 ppt of a sorbitol employed
[h]data is not available

TABLE 4

Concentrations and Results for the Freshwater Examples
Solutions contain 30 ppt[d] guar polymer, 5 ppt boric acid and 10 ppt NaOH

| Test | Delay agent[e] ppt | Vortex Closure minutes:seconds | Hang Lip Time minutes:seconds |
|---|---|---|---|
| 11 | 15 | 0:45 | 1:30 |
| 12 | 30 | 3:45 | 10:00 |
| 13 | 5 | 5:05 | 8:00 |
| 14 | 0 | 3:20 | 4:10 |
| 15[i] | 5 | 3:15 | 5:30 |

[i]boric acid reduced to 1.67 ppt

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of delivering a well treatment fluid composition into a hydrocarbon-bearing formation, comprising the steps of:
   providing a well treatment fluid that comprises a surfactant stabilized emulsion, the emulsion comprising a continuous phase and at least one discontinuous phase, the discontinuous phase comprising at least one chemical or biological agent;
   pumping the well treatment fluid into a well that comprises a first zone and a second zone, the first zone having a first ambient condition and the second zone having a second ambient condition that is different from the first ambient condition, whereby the well treatment fluid at one time contacts the first zone thereby exposing the well treatment fluid to the first ambient condition, and at a later time the well treatment fluid contacts the second zone thereby exposing the well treatment fluid to the second ambient condition;
   wherein the emulsion remains stable for at least about one minute when in contact with the first ambient condition, and destabilizes when in contact with the second ambient condition, thereby releasing the chemical or biological agent; and
   wherein the first ambient condition and the second ambient condition differ in at least one of (1) temperature, (2) pH, (3) salinity, (4) alcohol concentration, (5) stabilizing surfactant concentration, (6) organic ion concentration, (7) destabilizing surfactant concentration, (8) surfactant adsorbent material concentration, (9) ultrasonic energy, and (10) electrical field.

2. The method of claim 1, wherein the well treatment fluid is a fracturing fluid.

3. The method of claim 1, wherein the well treatment fluid is an acidizing treatment fluid.

4. The method of claim 1, wherein the well treatment fluid is a zone abandonment fluid or a conformance control fluid.

5. The method of claim 1, wherein the well treatment fluid is a drilling mud filter cake cleanup fluid.

6. The method of claim 1, wherein the emulsion is a microemulsion.

7. The method of claim 1, wherein the emulsion is prepared at the site of the well.

8. The method of claim 1, wherein the emulsion is prepared at another site and transported to the site of the well.

9. The method of claim 1, wherein the fluid composition further comprises at least one material selected from the group consisting of water, oils, salts, crosslinkers, polymers, biocides, corrosion inhibitors, corrosion dissolvers, pH modifiers, breakers, metal chelators, metal complexors, antioxidants, wetting agents, polymer stabilizers, clay stabilizers, scale inhibitors, scale dissolvers, wax inhibitors, wax dissolvers, asphaltene precipitation inhibitors, waterflow inhibitors, sand consolidation chemicals, proppants, permeability modifiers, microorganisms, viscoelastic fluids, gases, foaming agents, and nutrients for microorganisms.

10. The method of claim 1, wherein the chemical or biological agent is selected from the group consisting of crosslinkers, polymers, biocides, corrosion inhibitors, corrosion dissolvers, pH modifiers, breakers, metal chelators, metal complexors, antioxidants, wetting agents, polymer stabilizers, clay stabilizers scale inhibitors, scale dissolvers, wax inhibitors, wax dissolvers, asphaltene precipitation inhibitors, waterflow inhibitors, sand consolidation chemicals, permeability modifiers, foaming agents, microorganisms, nutrients for microorganisms, and salts.

11. The method of claim 10, wherein the chemical or biological agent is a breaker selected from the group consisting of oxidative breakers, enzymes, pH modifiers, metal chelators, metal complexors, polymer hydrolysis enhancers, and micelle disturbing substances.

12. The method of claim 1, wherein the fluid composition has a higher viscosity after its exposure to the second ambient condition than it had prior to its exposure to the second ambient condition.

13. The method of claim 1, wherein the fluid composition comprises at least one polymer and at least one crosslinker.

14. The method of claim 13, wherein the polymer is water soluble.

15. The method of claim 14, wherein the polymer is selected from the group consisting of galactomannan polymers; derivatized galactomannan polymers; xanthan gums; hydroxycelluloses; hydroxyalkyl celluloses; polyvinyl alcohol polymers; and polymers that are the product of a polymerization reaction comprising one or more monomers selected from the group consisting of vinyl pyrrolidone, 2-acrylamido-2-methylpropanesulfonic acid, acrylic acid and acrylamide.

16. The method of claim 14, wherein the crosslinker comprises at least one chemical from the group consisting of aluminum, chromium, iron, boron, titanium, and zirconium.

17. The method of claim 14, wherein the polymer and the crosslinker can react with each other readily when the emulsion is destabilized.

18. The method of claim 17, wherein the continuous phase comprises the polymer and the discontinuous phase comprises the crosslinker.

19. The method of claim 17, wherein the continuous phase comprises the polymer and the crosslinker, and wherein the discontinuous phase comprises at least one pH modifier that changes the pH of the fluid composition when the emulsion is destabilized.

20. The method of claim 1, wherein the first zone is at or near the surface of the well, the second zone is at or near the hydrocarbon-bearing formation, wherein the first ambient condition and the second ambient condition differ in at least temperature, and the difference in temperature between the first zone and the second zone is due to the naturally occurring difference between the ambient temperature in the first zone and the ambient temperature in the second zone.

21. The method of claim 1, wherein the first zone is at or near the surface of the well, the second zone is at or near the hydrocarbon-bearing formation, wherein the first ambient condition and the second ambient condition differ in at least pH, and the difference in pH between the first zone and the second zone is due to at least one pH modifier being present in the second zone at a higher concentration than in the first zone.

22. The method of claim 21, wherein the pH modifier present in the second zone is at least one of (a) a pH modifier naturally occurring in the second zone, (b) a pH modifier pumped into the second zone prior to contact of the fluid composition with the second zone, or (c) a pH modifier that is the product of a reaction of materials pumped into the second zone prior to contact of the fluid composition with the second zone.

23. The method of claim 1, wherein the first zone is at or near the surface of the well, the second zone is at or near the hydrocarbon-bearing formation, wherein the first ambient condition and the second ambient condition differ in at least salinity, and the salinity is greater in the second zone than in the first zone.

24. The method of claim 23, wherein the greater salinity in the second zone is due to at least one of (a) at least one salt naturally occurring in the second zone or (b) at least one salt pumped into the second zone prior to contact of the fluid composition with the second zone.

25. The method of claim 1, wherein the first zone is at or near the surface of the well, the second zone is at or near the hydrocarbon-bearing formation, and wherein the first ambient condition and the second ambient condition differ in at least alcohol concentration.

26. The method of claim 25, wherein the alcohol concentration is higher in the second zone than in the first zone due to at least one of (a) at least one alcohol-producing chemical reaction of one or more materials pumped into the second zone prior to contact of the fluid composition with the second zone or (b) at least one alcohol pumped into the second zone prior to contact of the fluid composition with the second zone.

27. The method of claim 26, wherein the well treatment fluid comprises at least one ester, and wherein the alcohol concentration is higher in the second zone than in the first zone due to at least one alcohol-producing chemical reaction from the ester.

28. The method of claim 1, wherein the first zone is at or near the surface of the well, the second zone is at or near the hydrocarbon-bearing formation, wherein the first ambient condition and the second ambient condition differ in at least stabilizing surfactant concentration, and the stabilizing surfactant concentration is lower in the second zone than in the first zone.

29. The method of claim 28, wherein the lower stabilizing surfactant concentration in the second zone is due to at least one of (a) at least one diluent of the stabilizing surfactant pumped into the second zone prior to contact of the fluid composition with the second zone, (b) at least one chemical that reacts to consume the stabilizing surfactant being pumped into the second zone prior to contact of the fluid composition with the second zone, or (c) at least one ambient condition of the second zone that decreases the solubility of the stabilizing surfactant.

30. The method of claim 29, wherein the ambient condition of the second zone that decreases the solubility is selected from the group consisting of (1) temperature, (2) pH, (3) salinity, (4) the destabilizing surfactant concentration of the fluid composition and (5) alcohol concentration.

31. The method of claim 1, wherein the first zone is at or near the surface of the well, the second zone is at or near the hydrocarbon-bearing formation, wherein the first ambient condition and the second ambient condition differ in at least surfactant adsorbent material concentration and the surfactant absorbent material concentration is higher in the second zone than in the first zone.

32. The method of claim 31, wherein the surfactant adsorbent material is at least one of a proppant or a material that comprises the hydrocarbon-bearing formation.

33. The method of claim 31, wherein the higher surfactant adsorbent material concentration in the second zone is due to at least one of (a) surfactant adsorbent material pumped into the second zone prior to contact of the fluid composition with the second zone or (b) surfactant adsorbent material naturally occurring in the second zone.

34. The method of claim 1, wherein the first zone is at or near the surface of the well, the second zone is at or near the hydrocarbon-bearing formation, and wherein the first ambient condition and the second ambient condition differ in at least organic ion concentration.

35. The method of claim 34, wherein the organic ion concentration is higher in the second zone than in the first zone due to at least one of (a) at least one organic ion producing reaction of materials pumped into the second zone prior to contact of the fluid composition with the second zone or (b) at least one organic ion pumped into the second zone prior to contact of the fluid composition with the second zone.

36. The method of claim 1, wherein the first zone is at or near the surface of the well, the second zone is at or near the hydrocarbon-bearing formation, wherein the first ambient condition and the second ambient condition differ in at least destabilizing surfactant concentration and the destabilizing surfactant concentration is higher in the second zone than in the first zone.

37. The method of claim 1, wherein the first zone is at or near the surface of the well, the second zone is at or near the hydrocarbon-bearing formation, and wherein the first ambient condition and the second ambient condition differ in at least ultrasonic energy due to ultrasonic energy being pulsed in the second zone and not in the first zone.

38. The method of claim 37, wherein the ultrasonic energy is generated from an ultrasonic source present in the second zone.

39. The method of claim 1, wherein the first zone is at or near the surface of the well, the second zone is at or near the hydrocarbon-bearing formation, wherein the discontinuous phase comprises a net electrical charge at its surface, and wherein the first ambient condition and the second ambient condition differ in at least electrical field due to an electrical field being present in the second zone that is not present in the first zone.

40. A method of delivering a well treatment fluid composition, said well treatment fluid being selected from the group consisting of fracturing fluid and acidizing treatment fluid, to a hydrocarbon-bearing formation, comprising the steps of:

providing a well treatment fluid that comprises a surfactant stabilized emulsion, the emulsion comprising a continuous phase and at least one discontinuous phase, the discontinuous phase comprising at least one chemical or biological agent;

adding and mixing into the fluid, prior to pumping it into the well, at least one chemical that undergoes a chemical reaction or that dissolves in the well treatment fluid composition; wherein the chemical that undergoes a chemical reaction or that dissolves causes a change in at least one characteristic of the well treatment fluid selected from the group consisting of (1) pH, (2) alcohol concentration, (3) stabilizing surfactant concentration, (4) organic ion concentration, (5) salinity, and (6) destabilizing surfactant concentration as the chemical reaction proceeds or as the chemical is dissolved; and wherein the change in the at least one characteristic causes sufficient destabilization of the emulsion to cause the chemical or biological agent to be released;

pumping the well treatment fluid into the well before the reaction of the chemical or dissolution of the chemical goes to completion.

41. The method of claim 40, wherein the well treatment fluid is a drilling mud filter cake cleanup fluid.

42. The method of claim 40, wherein the chemical or biological agent is selected from the group consisting of crosslinkers, polymers, biocides, corrosion inhibitors, corrosion dissolvers, pH modifiers, breakers, metal chelators, metal complexors, antioxidants, wetting agents, polymer stabilizers, clay stabilizers, scale inhibitors, scale dissolvers, wax inhibitors, wax dissolvers, asphaltene precipitation inhibitors, waterflow inhibitors, sand consolidation chemicals, permeability modifiers, foaming agents, microorganisms, nutrients for microorganisms, and salts.

43. The method of claim 42, wherein the chemical or biological agent is a breaker selected from the group consisting of oxidative breakers, enzymes, pH modifiers, metal chelators, metal complexors, polymer hydrolysis enhancers, and micelle disturbing substances.

44. The method of claim 40, wherein the fluid composition has a higher viscosity after the reaction of the chemical or dissolution of the chemical goes to completion.

45. A method of delivering a well treatment fluid composition to a hydrocarbon-bearing formation, comprising the steps of:

providing a well treatment fluid that comprises a surfactant stabilized microemulsion, the microemulsion comprising a continuous phase and at least one discontinuous phase, the discontinuous phase comprising at least one chemical or biological agent;

adding and mixing into the fluid, prior to pumping it into the well, at least one chemical that undergoes a chemical reaction or that dissolves in the well- treatment fluid composition; wherein the chemical that undergoes a chemical reaction or that dissolves causes a change in at least one characteristic of the well treatment fluid selected from the group consisting of (1) pH, (2) alcohol concentration, (3) stabilizing surfactant concentration, (4) organic ion concentration, (5) salinity, and (6) destabilizing surfactant concentration as the chemical reaction proceeds or as the chemical is dissolved; and wherein the change in the at least one characteristic causes sufficient destabilization of the emulsion to cause the chemical or biological agent to be released;

pumping the well treatment fluid into the well before the reaction of the chemical or dissolution of the chemical goes to completion.

* * * * *